(12) United States Patent
Cho et al.

(10) Patent No.: US 12,183,948 B2
(45) Date of Patent: Dec. 31, 2024

(54) SEPARATOR FOR SECONDARY BATTERY, MANUFACTURING METHOD THEREFOR, AND LITHIUM SECONDARY BATTERY COMPRISING SAME

(71) Applicant: SAMSUNG SDI CO., LTD., Yongin-si (KR)

(72) Inventors: Jaehyun Cho, Suwon-si (KR); Byung-Soo Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 521 days.

(21) Appl. No.: 17/609,804

(22) PCT Filed: Dec. 11, 2019

(86) PCT No.: PCT/KR2019/017516
§ 371 (c)(1),
(2) Date: Nov. 9, 2021

(87) PCT Pub. No.: WO2020/226251
PCT Pub. Date: Nov. 12, 2020

(65) Prior Publication Data
US 2022/0238958 A1    Jul. 28, 2022

(30) Foreign Application Priority Data
May 9, 2019  (KR) .................. 10-2019-0054438

(51) Int. Cl.
H01M 50/449 (2021.01)
H01M 10/0525 (2010.01)
(Continued)

(52) U.S. Cl.
CPC ....... H01M 50/449 (2021.01); H01M 50/403 (2021.01); H01M 50/42 (2021.01);
(Continued)

(58) Field of Classification Search
CPC .. H01M 50/449; H01M 50/403; H01M 50/42; H01M 50/426; H01M 50/443;
(Continued)

(56) References Cited

U.S. PATENT DOCUMENTS

2013/0059192 A1* 3/2013 Kajita ................. H01M 50/457
429/143
2014/0363726 A1 12/2014 Honda et al.
(Continued)

FOREIGN PATENT DOCUMENTS

CN    102983300 A    3/2013
CN    103947009 A    7/2014
(Continued)

OTHER PUBLICATIONS

Chinese Office action mailed Jan. 19, 2023 for corresponding Chinese Patent Application No. 201980096225.2, together with Jan. 12, 2023 Search Report.
(Continued)

*Primary Examiner* — Matthew W Van Oudenaren
(74) *Attorney, Agent, or Firm* — Lee IP Law, P.C.

(57) ABSTRACT

An embodiment provides a separator for a secondary battery, a manufacturing method therefor, and a lithium secondary battery comprising same, the separator including: a porous substrate; and a coating layer including a plurality of ring patterns on at least one surface of the porous substrate, wherein the ring patterns include a plurality of polymer particulates; the ring pattern is spaced apart from each other at regular intervals; a particle diameter of the ring pattern is 10 μm to 200 μm, and a ring of the ring pattern has a width (thickness of the ring) of 0.2 μm to 1.5 μm.

19 Claims, 5 Drawing Sheets

(51) Int. Cl.
  *H01M 50/403* (2021.01)
  *H01M 50/42* (2021.01)
  *H01M 50/426* (2021.01)
  *H01M 50/443* (2021.01)
  *H01M 50/489* (2021.01)

(52) U.S. Cl.
  CPC ....... *H01M 50/426* (2021.01); *H01M 50/443* (2021.01); *H01M 50/489* (2021.01); *H01M 10/0525* (2013.01)

(58) Field of Classification Search
  CPC .. H01M 50/489; H01M 50/463; H01M 50/46; H01M 50/491; H01M 10/0525; H01M 10/052
  See application file for complete search history.

(56) References Cited

U.S. PATENT DOCUMENTS

| | | | |
|---|---|---|---|
| 2015/0140402 A1* | 5/2015 | Kim | H01M 50/461 429/144 |
| 2018/0309108 A1* | 10/2018 | Shin | H01M 50/42 |

FOREIGN PATENT DOCUMENTS

| | | | |
|---|---|---|---|
| CN | 104659310 A | | 5/2015 |
| EP | 3352248 A1 | | 7/2018 |
| JP | 2018-147578 A | | 9/2018 |
| KR | 10-2006-0072065 A | | 6/2006 |
| KR | 10-2007-0000231 A | | 1/2007 |
| KR | 10-2009-0083854 A | | 1/2009 |
| KR | 10-2012-0127059 A | | 11/2012 |
| KR | 10-2014-0066786 A | | 6/2014 |
| KR | 10-2015-0057480 A | | 5/2015 |
| KR | 10-2016-0057345 A | | 5/2016 |
| KR | 20160057345 | * | 5/2016 |
| KR | 10-2017-0113474 A | | 10/2017 |
| KR | 10-1887603 B1 | | 8/2018 |
| WO | WO 2006/068428 A1 | | 6/2006 |

OTHER PUBLICATIONS

Chinese Office Action dated Jan. 22, 2024, of the corresponding Chinese Patent Application No. 201980096225.2.

Office Action dated Aug. 21, 2023, of the corresponding Chinese Patent Application No. 201980096225.2.

International Search Report dated Mar. 27, 2020 for PCT/KR2019/017516.

* cited by examiner

SEPARATOR FOR SECONDARY BATTERY, MANUFACTURING METHOD THEREFOR, AND LITHIUM SECONDARY BATTERY COMPRISING SAME

CROSS REFERENCE TO RELATED APPLICATIONS

This is the U.S. national phase application based on PCT/KR2019/017516 filed on Dec. 11, 2019, which is based on Korean Patent Application No. 10-2019-0054438 filed on May 9, 2019, the entire contents of each of which are hereby incorporated by reference.

TECHNICAL FIELD

A separator for a lithium secondary battery, a manufacturing method therefor, and a lithium secondary battery comprising the same are related.

BACKGROUND ART

A positive electrode and a negative electrode including a material capable of intercalating and deintercalating lithium ions are impregnated into an electrolyte, and a separator is disposed between the positive electrode and the negative electrode. Among them, the separator is used as a movement path of the electrolyte ions while preventing direct contact (internal short-circuit) between the positive electrode and the negative electrode.

In the case of manufacturing a lithium secondary battery, if the electrode and the separator are not properly bound, the positive and negative electrodes shrink and expand repeatedly during charging and discharging of the lithium battery, which may cause deformation of the battery shape and problems in battery performance and stability by a non-uniform reaction during a battery operation.

When a lithium secondary battery is externally shorted, a large current flows to generate heat, thereby increasing a battery temperature and starting a thermal runaway, which may lead to an operation of a safety valve or ignition due to evaporation of an electrolyte or heat-generation. In order to prevent this, a porous body including a heat-melting resin such as polyolefin is used in the separator. When the temperature inside the battery rises above a certain temperature, the separator melts to block the openings, thereby a shutdown function of stopping a reaction of a battery and suppressing heat-generation may be applied.

However, in the case of a large secondary battery for power storage or a vehicle, heat dissipation is poor, and when overheating occurs inside the secondary battery, a temperature of a secondary battery increases to 400 to 500° C. in a short time. If this condition persists, a meltdown or melt cracking of the separator may occur, causing a short circuit current to flow due to a contact between the electrodes, and an exothermic state causes thermal runaway.

DISCLOSURE

Technical Problem

An embodiment provides a separator for secondary battery according to an embodiment having improved adhesion between an electrode and a separator and reduced interfacial resistance, a method of manufacturing the separator, and a lithium secondary battery including the separator.

Technical Solution

An embodiment provides a separator for a secondary battery including a porous substrate; and a coating layer including a plurality of ring patterns on at least one surface of the porous substrate, wherein the ring pattern includes a plurality of polymer particulates, the ring pattern is spaced apart from each other at regular intervals, a particle diameter of the ring pattern is 10 μm to 200 μm, and a ring of the ring pattern has a width (thickness of the ring) of 0.2 μm to 1.5 μm.

The ring pattern may be spaced apart from each other at an interval of 10 μm to 1000 μm.

The ring pattern may have a particle diameter of 50 μm to 150 μm.

The ring of the ring pattern may have a width (thickness of the ring) of 0.5 μm to 1.2 μm.

The polymer particulates may include at least one selected from fluorine-based polymer particulates, (meth)acrylic polymer particulates, and a mixture thereof.

A particle diameter of the polymer particulates may be 100 nm to 600 nm.

The fluorine-based polymer particulates may include at least one selected from polyvinylidene fluoride (PVdF), polyvinylidene fluoride-co-hexafluoropropylene, and polyvinylidene fluoride-co-trichloroethylene.

The (meth)acrylic polymer particulates may include at least one selected from poly(meth)acrylate, polybutyl(meth)acrylate, polypentyl(meth)acrylate, polyhexyl(meth)acrylate, and polyacrylonitrile.

The ring pattern may have a loading amount of 0.5 g/m² to 1.5 g/m².

The coating layer may have a thickness of 0.1 μm to 5 μm.

An area of the ring pattern may be 40% to 80% of the total area of the porous substrate, and an area occupied by the rings of the ring pattern may be 5% to 30% of the total area of the porous substrate.

In another embodiment, a method of manufacturing the separator for a secondary battery includes mixing at least one of fluorine-based polymer particulates, (meth)acrylic polymer particulates, and a mixture thereof with water to prepare a coating layer composition, and coating the coating layer composition on at least one surface of a porous substrate by an inkjet coating method and drying it.

The coating layer composition may have a viscosity of 0.1 cps to 10 cps.

The coating layer composition may include fluorine-based polymer particulates and (meth)acrylic polymer particulates in a weight ratio of 90:10 to 50:50.

The fluorine-based polymer particulates may include polymer particulates having a particle diameter of 100 nm to 300 nm.

The (meth)acrylic polymer may include polymer particulates having a particle diameter of 250 nm to 600 nm.

The inkjet coating method may include spraying and coating the coating layer composition with a nozzle number density of 50 (dpi) to 1000 (dpi) of an inkjet head, at a frequency of 1.0 KHz to 10 KHz at a temperature of 20° C. to 55° C., and at a speed of 10 mm/sec to 500 mm/sec on a porous substrate.

Another embodiment provides a lithium secondary battery including a positive electrode; a negative electrode; the separator for a secondary battery between the positive electrode and the negative electrode; and an electrolyte.

Advantageous Effects

By improving the adhesion between the electrode and the separator and reducing the interfacial resistance, cycle-life characteristics of the battery can be improved.

<Description of Symbols>

| | |
|---|---|
| 1: ring pattern | 3: ring |
| 5: coating layer | 7: porous substrate |
| 100: lithium secondary battery | 112: negative electrode |
| 113: separator | 114: positive electrode |
| 120: battery case | 140: sealing member |

MODE FOR INVENTION

Hereinafter, the present invention will be described in more detail. Configurations shown in the embodiments and drawings described herein are only one of the most preferred embodiments of the present invention, and do not represent all of the technical spirit of the present invention, there are various equivalents that may be substituted for them or exemplary variations at the time of the present application.

In the present specification, when a definition is not otherwise provided, "(meth)acrylic" and "(meth)acrylate" may mean acrylic or methacrylic, and acrylate or methacrylate, respectively.

In addition, in the present specification when a definition is not otherwise provided, the particle diameter may be an average particle size (D50) at a volume ratio of 50% in a cumulative size-distribution curve. The average particle size (D50) may be measured by a well-known method for a person of an ordinary skill in the art. For example, it may be measured by a particle size analyzer, or from TEM (transmission electron microscope) or SEM (scanning electron microscope) photographs. Alternatively, a dynamic light-scattering measurement device is used to perform a data analysis, and the number of particles is counted for each particle size range and from this, the D50 value may be easily obtained through a calculation.

An embodiment provides a separator including a porous substrate and a coating layer including a plurality of ring patterns on at least one surface of the porous substrate.

Lithium secondary batteries are generally manufactured by interposing a separator between a positive electrode and a negative electrode, winding them, and then (heat) compressing at a predetermined temperature and pressure. By the compression process, as the adhesion (resistance) at the interface between the positive electrode and the separator and/or at the interface between the negative electrode and the separator increases, discharge capacity may continuously decrease as charge/discharge cycle of the lithium secondary battery progresses, high-rate charge/discharge characteristics may be reduced, and a problem in terms of battery safety may occur. In order to solve these problems, a separator having a coating layer formed by coating a mixture of a plurality of binder polymers and inorganic materials on at least one surface of a porous substrate is being manufactured. However, even in this case, in order to increase bondability between the separator and the electrode, a significant amount of the binder polymer is exposed to the surface of the separator, so that a side reaction between the binder polymer and the electrolyte may occur, causing the separator to swell, and as a result, ionic conductivity and the battery cycle-life may be deteriorated.

In order to solve the above problem, provided is a separator for a secondary battery including the coating layer of the separator includes a plurality of ring patterns spaced apart from each other at regular intervals, wherein the ring pattern includes a plurality of polymer particulates, a particle diameter of the ring pattern is 10 μm to 200 μm, and a ring of the ring pattern have a width (thickness of the ring) of 0.2 μm to 1.5 μm.

Hereinafter, the separator is described with reference to FIGS. 1 and 2.

Figure 1:
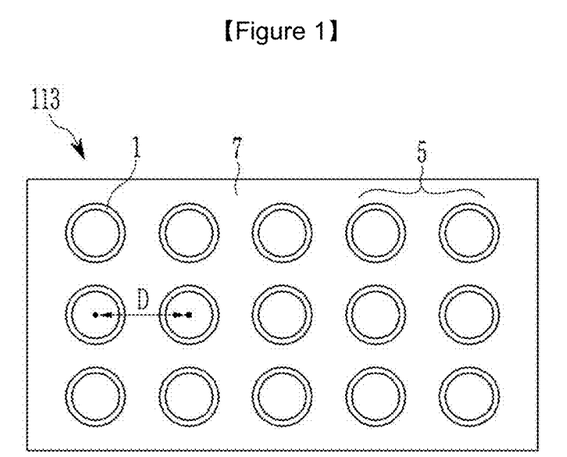
FIG. 1 is a schematic view showing a coating layer of a separator according to an embodiment.
Figure 2:
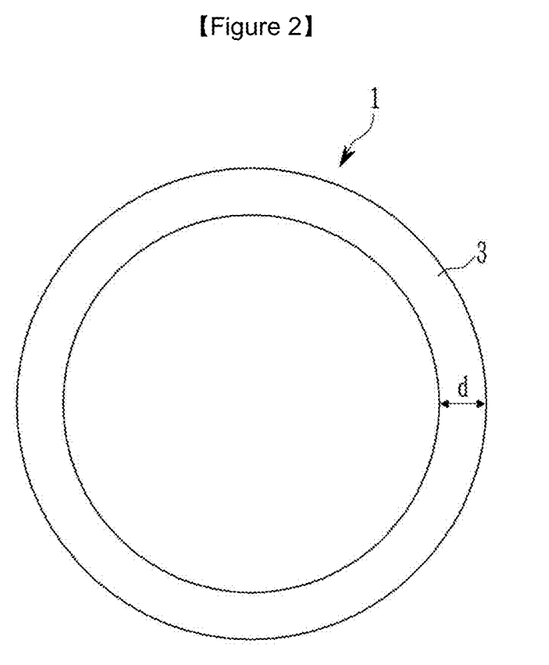
FIG. 2 is a schematic view of a ring pattern included in a coating layer of a separator according to an embodiment.

FIG. 1 is a schematic view showing the coating layer of the separator, and FIG. 2 is a schematic view of a ring pattern included in a coating layer of a separator.

Referring to FIG. 1, a plurality of ring patterns included in the coating layer 5 according to an embodiment may be spaced apart from each other at regular intervals. The plurality of ring patterns spaced apart from each other at regular intervals may have a spacing distance corresponding to greater than or equal to 50% and specifically, greater than or equal to 60%, or greater than or equal to 80% based on 100% of the total number of the ring patterns within a range of any spacing distance (D) (e.g., an average space distance) ±20% (e.g., ±10%).

The plurality of ring patterns may have a spacing distance (D) at regular intervals of 10 μm to 1000 μm, specifically, greater than or equal to 10 μm, greater than or equal to 20 μm, greater than or equal to 30 μm, greater than or equal to 40 μm, or greater than or equal to 50 μm and less than or equal to 1000 μm, less than or equal to 800 μm, less than or equal to 600 μm, less than or equal to 400 μm, less than or equal to 300 μm, or less than or equal to 270 μm. On the other hand, the spacing distance (D) may be a distance between centers of the adjacent ring patterns 1. When the spacing distance (D) is within the ranges, an adhesion effect between the coating layer and the electrode may be increased. Accordingly, a cell swelling phenomenon that occurs, when the adhesion between the electrode and the separator is insufficient, may be effectively suppressed, and ion conductivity may be improved, improving cycle-life characteristics of a battery.

On the other hand, in the separator for a secondary battery according to an embodiment, the coating layer is formed in an inkjet coating method which is described later, and the plurality of ring patterns included in the coating layer may be regularly aligned.

Referring to FIG. 2, in the plurality of ring patterns 1, a plurality of polymer particulates is present in a ring 3, the polymer particulates are substantially not present or present in a small loading amount of less than equal to 50 wt % inside of the ring pattern 1 excluding the ring 3, compared with in the ring 3. Accordingly, compared with a case of applying a ring pattern filled with a polymer material or evenly coating the polymer material on the whole surface of a porous substrate, a pore-clogging phenomenon may be minimized. Accordingly, the separator swelling phenomenon due to a side reaction with an electrolyte solution may be improved, and ion conductivity may be improved.

On the other hand, in order to maintain an adhesive force between the electrode and the separator, it is important to find an optimum numerical range of the particle diameter of the ring pattern 1 and a width of the ring 3 (thickness (d) of the ring). In this regard, the ring pattern may have a particle diameter of 10 μm to 200 μm, for example, a particle diameter of 50 μm to 150 μm, or 100 μm to 150 μm. The ring of the ring pattern has a width of 0.2 μm to 1.5 μm, for example, 0.4 μm to 1.3 μm, or 0.5 μm to 1.1 μm. When the ring pattern has a particle diameter and a width of the ring (a thickness of the ring) within the ranges, cycle-life characteristics of a battery may be improved by improving the adhesion between electrode and separator and minimizing interfacial resistance.

On the other hand, the particle diameter range of the ring pattern 1 and the thickness range of the ring of the ring pattern 3 specifically belong to greater than or equal to 50% and specifically, greater than or equal to 60% or greater than or equal to 80% of the ring pattern 1 based on 100% of the total number of the ring pattern 1.

The plurality of polymer particulates present in the ring 3 of the ring pattern 1 may include at least one selected from fluorine-based polymer particulates, (meth)acrylic polymer particulates, and a mixture thereof, and the polymer particulates may have a particle diameter of 100 nm to 600 nm.

The fluorine-based polymer particulates may include at least one selected from polyvinylidene fluoride (PVdF), polyvinylidene fluoride-co-hexafluoropropylene, and polyvinylidene fluoride-co-trichloroethylene. In addition, the particle diameter of the fluorine-based polymer particulates may be 100 nm to 300 nm, for example 100 nm to 250 nm, 100 nm to 200 nm, or 150 nm to 200 nm. Accordingly, the adhesion and oxidation resistance between separator and electrode plate may be improved, and when the fluorine-based polymer particulates have a particle diameter within the range, battery performance may be improved by minimizing movement resistance of lithium ions and also, minimizing the thickness of the coating layer.

The (meth)acrylic polymer particulates may include at least one selected from poly(meth)acrylate, polybutyl(meth)acrylate, polypentyl(meth)acrylate, polyhexyl(meth)acrylate, and polyacrylonitrile.

A particle diameter of the (meth)acrylic polymer particulates may be greater than or equal to 250 nm, greater than or equal to 300 nm, or greater than or equal to 350 nm, and less than or equal to 600 nm, less than or equal to 550 nm, less than or equal to 500 nm, or less than or equal to 450 nm. When the particle diameter of the (meth)acrylic polymer particulates falls within the above ranges, movement resistance of lithium ions may be minimized to ensure a performance of the lithium secondary battery.

In the coating layer, a loading amount of the ring pattern may be 0.5 g/m² to 1.5 g/m², for example 0.7 g/m² to 1.3 g/m², or 1.0 g/m² to 1.2 g/m². When the ring pattern has a loading amount within the range, cycle-life characteristics of a battery may be improved by improving the adhesion and ion conductivity of the separator but reducing the interfacial resistance between electrode and separator.

The coating layer may be formed as a thin film with a thickness (total thickness) of 0.1 μm to 5 μm, for example, 0.5 μm to 3.5 μm, 0.5 μm to 3.0 μm, 0.5 μm to 1.5 μm, or 0.5 μm to 1.2 μm.

In the coating layer, an area of the ring pattern (including an inner space of the ring pattern) may be 40% to 80% of a total area of the porous substrate, for example, 40% to 75%. On the other hand, the area of the ring pattern indicates an area sum of the area of the ring of the ring pattern and an area of an inner region of the ring pattern except for the ring.

In the coating layer, an area occupied by the ring of the ring pattern (not including the inner space of the ring pattern) may be 5% to 30% of the total area of the porous substrate, for example, 10% to 20%. In the coating layer, when the area of the ring pattern and the area occupied by the ring of the ring pattern are respectively within the ranges, the adhesion between the separator and electrode may be maintained at an appropriate level, and the interfacial resistance may be reduced, thereby improving cycle-life characteristics of a battery.

Hereinafter, a method of manufacturing a separator according to an embodiment is described.

Another embodiment provides a method of manufacturing a separator for a secondary battery that includes mixing at least one of fluorine-based polymer particulates, (meth)acrylic polymer particulates, and a mixture thereof with water to prepare a coating layer composition, coating the coating layer composition on at least one surface of a porous substrate by an inkjet coating method and drying it to manufacture the separator.

The fluorine-based polymer particulates have polymer particulates having a particle diameter of 100 nm to 300 nm, for example, 100 nm to 250 nm, 100 nm to 200 nm, or 150 nm to 200 nm, and the (meth)acrylic polymer particulates may include polymer particulates having a particle diameter of greater than or equal to 250 nm, greater than or equal to 300 nm, or greater than or equal to 350 nm and less than or equal to 600 nm, less than or equal to 550 nm, or less than or equal to 500 nm.

The coating layer composition may include the fluorine-based polymer particulates and the (meth)acrylic polymer particulates in a weight ratio of 90:10 to 50:50, 90:10 to 55:45, 90:10 to 60:40, 90:10 to 65:35, or 90:10 to 70:30. Within the ranges, interfacial resistance between the electrode and the separator is reduced, adhesion of the separator is improved, and accordingly, cycle-life characteristics of a battery may be improved.

The coating layer composition may have viscosity in a range of greater than or equal to 0.1 cps, greater than or equal to 0.5 cps, greater than or equal to 1 cps, or greater than or equal to 2 cps, and less than or equal to 50 cps, less than or equal to 45 cps, less than or equal to 40 cps, less than or equal to 35 cps, less than or equal to 30 cps, less than or equal to 25 cps, less than or equal to 20 cps, less than or equal to 15 cps, less than or equal to 10 cps, or less than or equal to 7 cps. When the coating layer composition has viscosity within the ranges, a ring pattern may be well formed to have a particle diameter and a width of a ring with within the ranges according to an embodiment of the present invention. When the coating layer composition has too low or high a viscosity, a coating layer may be difficult to form by applying the inkjet coating method, and also, the particle diameter and the ring width of the ring pattern according to an embodiment may be difficult to realize.

An Inkjet coater used for manufacturing the separator according to an embodiment is a piezoelectric-type or thermal bubble-type coater and may be used to spray the coating layer composition from a nozzle. The inkjet coating method is a coating method of applying a voltage through frequency control to push an ink (the coating layer composition).

Specifically, the inkjet coating method may be to spray and coat the coating layer composition on a porous substrate by setting the number of nozzles of an Inkjet head to have a density of 50 (dpi) to 1000 (dpi) at 20° C. to 55° C. at a frequency of 1.0 KHz to 10 KHz and a coating speed of 10 mm/sec to 500 mm/sec. When the inkjet coating method has the process conditions within the ranges, a coating layer in which ring patterns having a particle diameter and a ring width (thickness) are spaced apart at regular intervals on the porous substrate may be well formed. For example, when the density of the number of nozzles is increased, the particle diameter of the ring pattern, the ring width, and the spacing distance of the ring pattern may all decrease, and the number of the ring patterns in the coating layer may increase. On the contrary, when the density of the number of nozzles is decreased, the opposite result may be obtained.

A lithium secondary battery according to an embodiment includes a positive electrode; a negative electrode; the separator between the positive electrode and the negative electrode; and an electrolyte solution.

Figure 3:
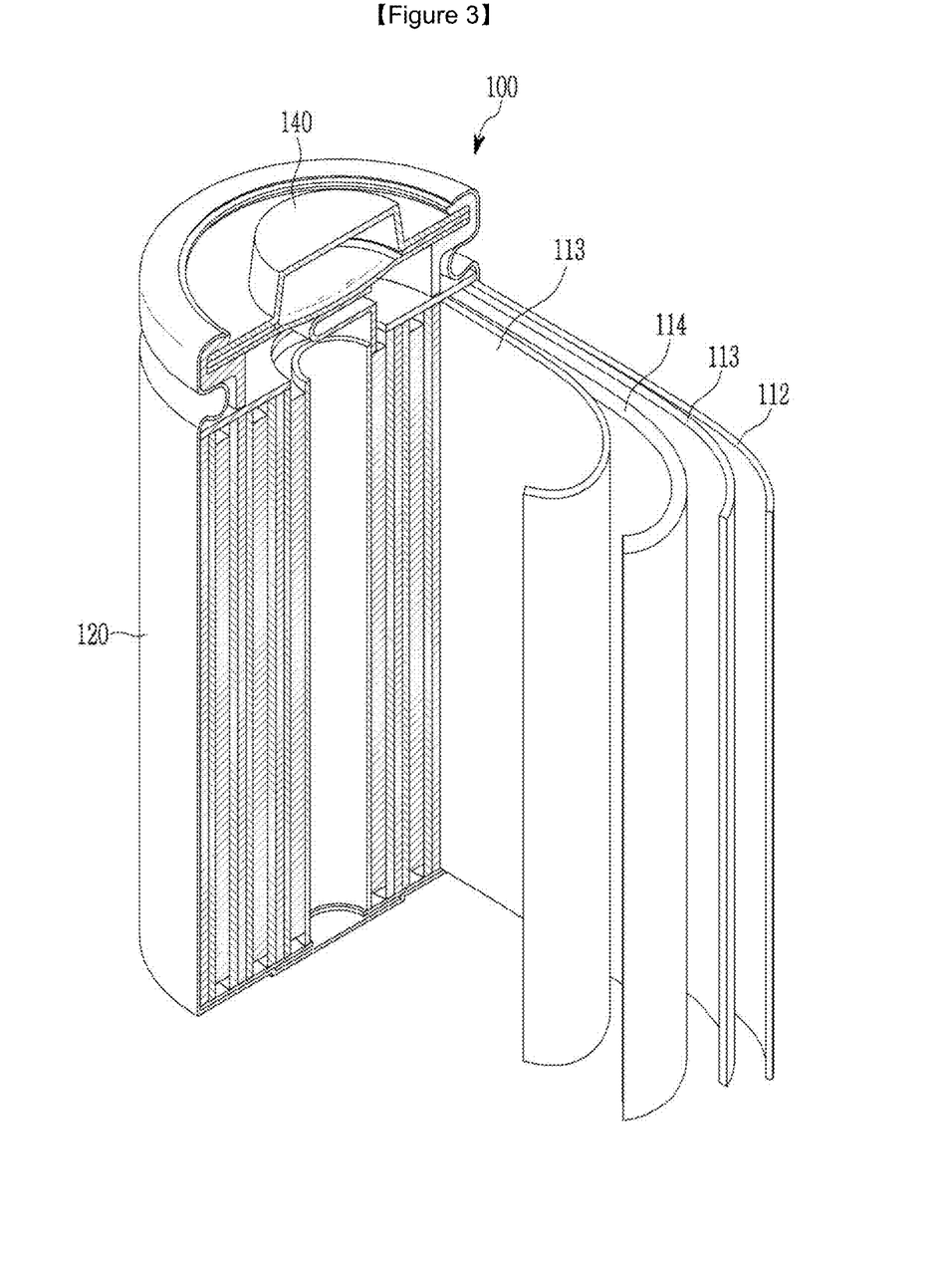
FIG. 3 is an exploded perspective view of a lithium secondary battery according to an embodiment.

The separator 113 separates a positive electrode 114 and a negative electrode 112 and provides a transporting passage for lithium ions. Detailed descriptions thereof are as described above. The entire thickness of the separator may be determined by a target capacity of the battery. A thickness of the separator may be, for example, 5 µm to 30 µm.

The negative electrode 112 includes a current collector and a negative active material layer formed on the current collector and, and the negative active material layer includes a negative active material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material which is any generally-used carbon-based negative active material in a lithium ion secondary battery and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (fired carbon at a low temperature) or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping and dedoping lithium may be Si, $SiO_x$ (0<x<2), a Si—C composite, a Si-Q alloy (wherein Q is selected from an alkali metal, an alkaline-earth metal, Group 13 to 16 elements, a transition element, a rare earth element, and a combination thereof, and not Si), Sn, $SnO_2$, a Sn—C composite, Sn—R (wherein R is selected from an alkali metal, an alkaline-earth metal, Group 13 to 16 elements, a transition element, a rare earth element, and a combination thereof, and not Sn). The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition elements oxide may include a vanadium oxide, a lithium vanadium oxide, and the like.

The negative active material layer also includes a binder and may further optionally include a conductive material.

The binder improves binding properties of negative active material particles with one another and with a current collector and examples thereof may be polyvinylalcohol, carboxylmethylcellulose, hydroxypropylcellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves electrical conductivity of an electrode, and any electrically conductive material may be used as a conductive material, unless it causes a chemical change and examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode 114 includes a current collector and a positive active material layer formed on the current collector.

The positive active material may be a compound (lithiated intercalation compound) capable of intercalating and deintercallating lithium. Specifically, at least one lithium metal composite oxide of lithium and a metal of cobalt, manganese, nickel, or a combination thereof may be used, and specific examples thereof may be a compound represented by one of the following chemical formulas. $Li_aA_{1-b}R_bD_2$ (wherein, in the above chemical formulas, $0.90 \leq a \leq 1.8$ and $0 \leq b \leq 0.5$); $Li_aE_{1-b}R_bO_{2-c}D_c$ (wherein, in the above chemical formula, $0.90 \leq a \leq 1.8$, $0 \leq b \leq 0.5$ and $0 \leq c \leq 0.05$); $LiE_{2-b}R_bO_{4-c}D_c$ (wherein, in the above chemical formula, $0 \leq b \leq 0.5$, $0 \leq c \leq 0.05$); $Li_aNi_{1-b-c}Co_{b-c}R_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, in the above chemical formula, $0.90 \leq \alpha \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$, (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$, (wherein, in the above chemical formula, $0.90 \leq a \leq 1.8$, $0 \leq b \leq 0.5$, $0 \leq c \leq 0.05$ and $0 < \alpha < 2$); $Li_aNi_bR_cG_dO_2$ (wherein, in the above chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2G_bO_4$ (wherein, in the above chemical formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; and $LiFePO_4$.

In the above chemical formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof and J is V, Cr, Mn, Co, Ni, Cu, or a combination thereof.

The positive active material may include the positive active material with the coating layer, or a compound of the active material and the active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not causes any side effects on the properties of the positive active material (e.g., ink jet coating, dipping), which is well known to persons having ordinary skill in this art, so a detailed description thereof is omitted.

The positive active material layer may also include a binder and a conductive material.

The binder improves binding properties of positive active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode and any electrically conductive material may be used as a conductive material, unless it causes a chemical change, and examples thereof may be one or more of natural graphite, artificial graphite, carbon black, acetylene black, ketjen black, a carbon fiber, a metal powder, a metal fiber, and the like of copper, nickel, aluminum, silver, and the like, or a polyphenylene derivative and the like.

The current collector may use Al but is not limited thereto.

The negative and positive electrodes may be fabricated by a method including mixing the active material, a conductive material, and a binder into an active material composition, and coating the composition on a current collector. The electrode manufacturing method is well known, and thus is not described in detail in the present specification. The electrolyte includes a non-aqueous organic solvent and a lithium salt.

The non-aqueous organic solvent serves as a medium for transmitting ions taking part in the electrochemical reaction of a battery.

The non-aqueous organic solvent may be selected from a carbonate-based, ester-based, ether-based, ketone-based, alcohol-based, or aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent includes methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent includes dibutyl ether, tetraglyme, diglyme, dimethoxyethane, 2-methyltetrahydrofuran, tetrahydrofuran, and the like, and the ketone-based solvent includes cyclohexanone, and the like. In addition, the alcohol-based solvent may be ethanol, isopropyl alcohol, and the like. The aprotic solvent may include nitriles such as R—CN (wherein R is a C2 to C20 linear, branched, or cyclic hydrocarbon group, and R may include a double bond, an aromatic ring, or an ether bond), amides such as dimethylformamide, dioxolanes such as 1,3-dioxolane, sulfolanes, and the like.

The non-aqueous organic solvent may be used alone or in combination of one or more, and a mixing ratio in the case of mixing one or more may be appropriately adjusted according to desired battery performance, which is widely understood by those skilled in the art.

The carbonate-based solvent may include a mixture of cyclic carbonate and chain-type carbonate. The cyclic carbonate and the linear carbonate are mixed together in the volume ratio of about 1:1 to about 1:9. Within this range, performance of electrolyte may be improved.

The non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by Chemical Formula 1.

[Chemical Formula 1]

In Chemical Formula 1, $R_1$ to $R_6$ are independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include an additive of vinylene carbonate or an ethylene carbonate-based compound of Chemical Formula 2 in order to improve cycle-life of a battery.

[Chemical Formula 2]

In Chemical Formula 2, $R_7$ and $R_8$ are independently hydrogen, a halogen group, a cyano group (CN), a nitro group ($NO_2$), or a C1 to C5 fluoroalkyl group, provided that at least one of $R_7$ and $R_8$ is a halogen group, a cyano group (CN), a nitro group ($NO_2$), or a C1 to C5 fluoroalkyl group.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the amount thereof may be adjusted appropriately in order to improve cycle-life.

The lithium salt dissolved in a non-aqueous organic solvent supplies a battery with lithium ions, basically operates the lithium secondary battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x-1}SO_2)(C_yF_{2y+1}SO_2)$ (wherein, x and y are natural numbers), LiCl, LiI, $LiB(C_2O_4)_2$ (lithium bis(oxalato) borate: LiBOB), or a combination thereof. A concentration of the lithium salt may range from 0.1 M to 2.0 M. When the lithium salt is included at the above concentration range, an electrolyte may have excellent performance and lithium ion mobility due to optimal electrolyte conductivity and viscosity.

The lithium secondary battery may be classified into a lithium ion battery, a lithium ion physical gel polymer battery, and a lithium ion chemical gel polymer battery according to types of separators and electrolyte solutions thereof. It may be classified into cylindrical, prismatic, coin-type, or pouch according to a shape, and may be classified into a bulk type and a thin film type according to a size. Structures and manufacturing methods for these batteries pertaining to this disclosure are well known in the art.

FIG. 3 is an exploded perspective view of a lithium secondary battery according to an embodiment. Referring to FIG. 3, the lithium secondary battery 100 is a cylindrical battery that includes a negative electrode 112, a positive electrode 114, a separator 113 disposed between the negative electrode 112 and the positive electrode 114, an electrolyte (not shown) impregnating the negative electrode 112, positive electrode 114, and separator 113, a battery case 120, and a sealing member 140 sealing the battery case 120. The lithium secondary battery 100 is fabricated by sequentially laminating a negative electrode 112, a separator 113, and a positive electrode 114, spirally winding them, and housing the spiral-wound product in a battery case 120.

Hereinafter, Preparation Examples and Examples are described in detail to describe the present invention in detail. However, Preparation Examples and Examples according to the present invention may be modified in various other forms, and the scope of the present invention should not be construed as being limited to the preparation examples and examples described below. Preparation Examples and Examples of the present invention are provided to explain in detail the present invention to those skilled in the art.

PREPARATION EXAMPLES

Preparation Example 1

A polyvinylidene fluoride-hexafluoropropylene copolymer (PVdF-HFP) (XPH-883, manufactured by Solvey, weight average molecular weight of 450,000 g/mol) latex was mixed to be 25 wt % with distilled water and then, stirred at 25° C. for 30 minutes to prepare a solution including fluorine-based polymer particulates having a particle diameter of 200 nm. The prepared solution was mixed with an acrylic polymer particulates having a particle diameter of 350 nm (compound composition: a mixture of polystyrene, 2-ethylhexyl acrylate and butyl acrylate, BM900B, manufactured by ZEON) to have a weight ratio of 90:10 between the PVdF-HFP copolymer latex and acrylic polymer particulates. Distilled water was added thereto to have a solid content of 5 wt % in the mixed solution and then, stirred at 25° C. for 30 minutes to prepare a coating layer composition. The coating layer composition had a viscosity (at 25° C.) of 4 cps.

Preparation Example 2

A polyvinylidene fluoride-hexafluoropropylene copolymer (PVdF-HFP) (a weight average molecular weight: 450,000 g/mol, XPH-883 manufactured by Solvey) latex was mixed to be 25 wt % with distilled water and then, stirred at 25° C. for 30 minutes to prepare a solution including fluorine-based polymer particulates having a particle diameter of 200 nm, and distilled water was added thereto to have a solid content of 5 wt % and then, stirred at 25° C. for 30 minutes to prepare a coating layer composition. The coating layer composition had viscosity (at 25° C.) of 2 cps.

Preparation Example 3

Distilled water was added to acrylic polymer particulates having a particle diameter of 350 nm (a compound: a mixture of polystyrene, 2-ethylhexyl acrylate, and butyl acrylate, BM900B manufactured by ZEON) to have a solid content of 5 wt % and then, stirred at 25° C. for 30 minutes to prepare a coating layer composition. The coating layer composition had a viscosity (at 25° C.) of 6 cps.

Comparative Preparation Example 1

A polyvinylidene fuloride-hexafluoropropylene copolymer (PVdF-HFP) (a weight average molecular weight of 450,000 g/mol, XPH-883 manufactured by Solvey) latex was mixed to be 25 wt % with distilled water and then, stirred at 25° C. for 30 minutes to prepare a solution including fluorine-based polymer particulates having a particle diameter of 200 nm. The prepared solution was mixed with an acrylic polymer particulates having a particle diameter of 350 nm (compound: a mixture of polystyrene, 2-ethylhexyl acrylate, and butyl acrylate, BM900B manufactured by ZEON) to have a weight ratio of 90:10 between the PVdF-HFP copolymer latex and acrylic polymer particulates. Distilled water was added to the mixed solution to have a solid content of 20 wt % and then, stirred at 25° C.

for 30 minutes to prepare a coating layer composition. The coating layer composition had a viscosity (at 25° C.) ranging from 50 cps to 100 cps.

EXAMPLES

Example 1

(Manufacture of Separator)

The coating layer composition prepared in Preparation Example 1 was coated on both surfaces of a porous substrate (SK 612HS, thickness: 12 μm, permeability: 115 sec/100 cc) to form a coating layer including a plurality of ring patterns spaced at regular intervals in an inkjet coating method. The inkjet coating was conducted by using a digital coater (Techno Smart Corp.), in which the number of nozzles of an Inkjet head was set to have a density of 360 (dpi), at 25° C., a frequency of 2.0 KHz, and 83 mm/sec. Subsequently, the coating layer was dried at a temperature of 80° C. and a wind speed of 15 m/sec for 3 minutes, manufacturing a separator with the coating layer.

(Manufacture of Coin Cell)

A positive active material, a carbon conductive agent (Denka Black, Denka Korea), and polyvinylidene fluoride (PVDF) were mixed in a weight ratio of 92:4:4 and then, with N-methyl pyrrolidone (NMP) to prepare slurry. The slurry was bar-coated on a 15 μm-thick aluminum current collector, dried at room temperature and once more at 120° C. under vacuum, and compressed and punched to manufacture a 45 μm-thick positive electrode plate.

A coin cell was manufactured by a conventional method using the manufactured positive electrode plate, the lithium metal counter electrode, the separator prepared by the above-described process, and the electrolyte. The electrolyte was prepared by dissolving 1.5 M LiPF$_6$ in a mixed solvent of EC (ethylene carbonate), DEC (diethyl carbonate), and EMC (ethylmethyl carbonate) (a volume ratio of 2:4:4).

Example 2

A coin cell was manufactured according to the same method as Example 1 except that the coating layer composition of Preparation Example 1 was used, and the number of nozzles of the Inkjet head was set to have a density of 120 dpi.

Example 3 and Example 4

A separator and a coin cell were manufactured according to the same methods respectively as Examples 1 and 2 except that a 16 μm-thick separator (a separator formed by coating an inorganic layer including inorganic particles with a total thickness of 4 μm on both surfaces of a 12 μm-thick polyethylene porous substrate) was used instead of the porous substrate.

Comparative Example 1

A separator and a coin cell were manufactured according to the same methods respectively as Examples 1 and 2 except that the coating was performed in a dip coating method.

Comparative Example 2

A separator and a coin cell were manufactured according to the same methods as Example 3 except that the dip coating method was used.

Comparative Example 3

A separator and a coin cell were manufactured according to the same method as Example 1 except that the coating layer composition of Comparison Preparation Example 1 was used instead of the coating layer composition of Preparation Example 1.

Reference Example 1

A coating layer composition of Preparation Example 1 was spray-coated under a liquid pressure of 0.2 bar and an air pressure of 0.5 bar with pulses of 60% to from a coating layer on both surfaces of a porous substrate, while the porous substrate (a thickness: 12 μm, air permeability: 115 sec/100 cc, 612HS manufactured by SK) was moved at 20 m/min. Subsequently, the coated porous substrate was dried at 80° C. at a wind speed of 15 m/sec for 0.03 hours to manufacture a separator having the coating layer and a coin cell was manufactured in the same manner as in Example 1.

Table 1 below shows, regarding the separators according to Examples 1 to 4, Comparative Examples 1 to 3, and Reference Example 1, a particle diameter of a ring pattern, a width of a ring (a thickness of the ring) of the ring pattern, an area ratio of the ring pattern based on an area of a porous substrate, and an area ratio of a ring portion of the ring pattern based on the area of the porous substrate, a loading amount of a coating layer composition, a total thickness of a coating layer, and a coating method.

TABLE 1

| | Particle diameter of ring pattern (μm) | Width (thickness) of ring (μm) | Spacing distance of ring pattern (μm) | Area ratio of ring pattern (based on area of porous substrate) (%) | Area ratio of the ring portion of the ring pattern (based on area of porous substrate) (%) | Loading amount of coating layer composition (g/m$^2$) | Total thickness of coating layer (μm) | Coating method |
|---|---|---|---|---|---|---|---|---|
| Ex. 1 | 120 | 1.0 | 75 | 70 | 30 | 1.0 | 1.0 | Inkjet |
| Ex. 2 | 60 | 0.7 | 210 | 40 | 29 | 0.5 | 0.7 | Inkjet |
| Ex. 3 | 110 | 1.0 | 70 | 60 | 25 | 1.1 | 3.0 | Inkjet |
| Ex. 4 | 70 | 0.6 | 205 | 35 | 23 | 0.7 | 2.7 | Inkjet |

TABLE 1-continued

|  | Particle diameter of ring pattern (μm) | Width (thickness) of ring (μm) | Spacing distance of ring pattern (μm) | Area ratio of ring pattern (based on area of porous substrate) (%) | Area ratio of the ring portion of the ring pattern (based on area of porous substrate) (%) | Loading amount of coating layer composition (g/m²) | Total thickness of coating layer (μm) | Coating method |
|---|---|---|---|---|---|---|---|---|
| Comp. Ex. 1 | — | — | — | 100 | — | 1.3 | 1.3 | Dip coating |
| Comp. Ex. 2 | — | — | — | 100 | — | 1.2 | 1.3 | Dip coating |
| Ref. Ex. 1 | 190 | 30 | irregular | — | — | 1.2 | 2.0 | Spray |

On the other hand, in Comparative Example 3, a separator including a coating layer including a ring pattern was not formed in the inkjet coating method due to high viscosity of the coating layer composition.

Evaluation Example 1: Measurement of Air Permeability of Separator

The separators according to Examples 1 to 4, Comparative Examples 1 and 2, and Reference Example 1 were respectively cut into a size of 50 mm×50 mm to prepare each specimen. The air permeability was obtained by measuring time (sec) that it took for 100 cc of air to completely pass the specimens respectively, and the results are shown in Table 2.

Evaluation Example 2: Evaluation of Ion Conductivity Characteristics of Separator Ion conductivity of the separators according to Example 1 to Example 4, Comparative Example 1, Comparative Example 2, and Reference Example 1 was measured by using an electric impedance spectroscopy measurement instrument, a VSP model manufactured by Bio-Logic SAS. Herein, an amplitude of 1000 mV at an open circuit potential and a frequency from 10000 MHz to 1 Hz was scanned and the results are shown in Table 2.

Evaluation Example 3

Evaluation of Bending Strength Characteristics (Adhesion) of Separator

Electrode adhesion of the separators according to Example 1 to Example 4, Comparative Example 1, Comparative Example 2, and Reference Example 1 was measured. The electrode adhesion was evaluated by measuring adhesion (bending strength) between an active material of a substrate and each separator was measured in a 3-point bending (Instron) method. Pouch cells (a charge (1 C/36 min) state for sale) after the formation were pressed at 5 mm/min by using a jig, and a MAX value (N, MPa) from a zero-point up to bending of 3 mm was measured. The bending strength was obtained as an average by measuring five samples and averaging three values except for a maximum value and a minimum value. The results are shown in Table 2.

Evaluation Example 4

Measurement of Film Resistance of Coin Cell

The coin cells according to Example 1 to Example 4, Comparative Example 1, Comparative Example 2, and Reference Example 1 were allowed to stand at room temperature for one day, and resistance of the separators was respectively measured by using an impedance-measuring method. The results are shown in Table 2.

Evaluation Example 5

Evaluation of High Temperature Cycle-life Characteristics

The coin cell according to Example 1 to Example 4, Comparative Example 1, Comparative Example 2, and Reference Example 1 were constant current-charged at a current of a 0.1 C rate up to a voltage of 4.3 V (vs. Li) at 45° C. and then, cut off at a current of a 0.05 C rate, while 4.3 V was maintained in a constant voltage mode. Subsequently, the coin cells were discharged at a constant current of a 0.1 C rate to a voltage of 3.0 V (vs. Li) (the 1st cycle). Then, the coin cells were constant current-charged at a current of a 1.0 C rate to a voltage of 4.3 V (vs. Li) at 45° C. and cut off at a current of a 0.05 C rate, while 4.3 V was maintained in a constant voltage mode. Next, the coin cells were discharged at a constant current of a 1.0 C rate and discharged to a voltage of 3.0 V (vs. Li), whose cycle was repeated up to the 500 cycles. In all the charge and discharge cycles, a pause of 10 minutes was set by every charge/discharge cycle. The cycle life results reflecting the charge and discharge experiment results are shown in Table 2.

TABLE 2

|  | Air permeability (sec/100 cc) | Ion conductivity (S/mm) | Bending strength (N) | Film resistance (Ω) | High temperature cycle-life (45° C., 500 cycle) (%) |
|---|---|---|---|---|---|
| Example 1 | 115 | 0.021 | 420 | 0.43 | 93 |
| Example 2 | 111 | 0.022 | 410 | 0.40 | 94 |

TABLE 2-continued

|  | Air permeability (sec/100 cc) | Ion conductivity (S/mm) | Bending strength (N) | Film resistance (Ω) | High temperature cycle-life (45° C., 500 cycle) (%) |
|---|---|---|---|---|---|
| Example 3 | 135 | 0.018 | 450 | 0.53 | 91 |
| Example 4 | 130 | 0.017 | 440 | 0.56 | 90 |
| Comparative Example 1 | 140 | 0.0087 | 440 | 0.81 | 83 |
| Comparative Example 2 | 175 | 0.0057 | 435 | 0.84 | 81 |
| Reference Example 1 | 120 | 0.016 | 445 | 0.65 | 88 |

Referring to Table 2, the separators according to Examples 1 to 4 exhibited improved air permeability from 111 sec/100 cc to 135 sec/100 cc, compared with the comparative examples. In addition, the separators of Examples 1 to 4 exhibited similar bending strength ranging from 410 N to 450 N and thus similar adhesion between electrode and separator to those of the comparative examples, greatly improved ion conductivity of 0.017 S/mm to 0.022 S/mm, and greatly improved film resistance, compared to those of the comparative examples. Accordingly, the coin cells according to Examples 1 to 4 exhibited greatly improved high temperature cycle-life characteristics of 90% or more at the 500 cycles, compared with those of the comparative examples.

Evaluation Example 6

Figure 4:
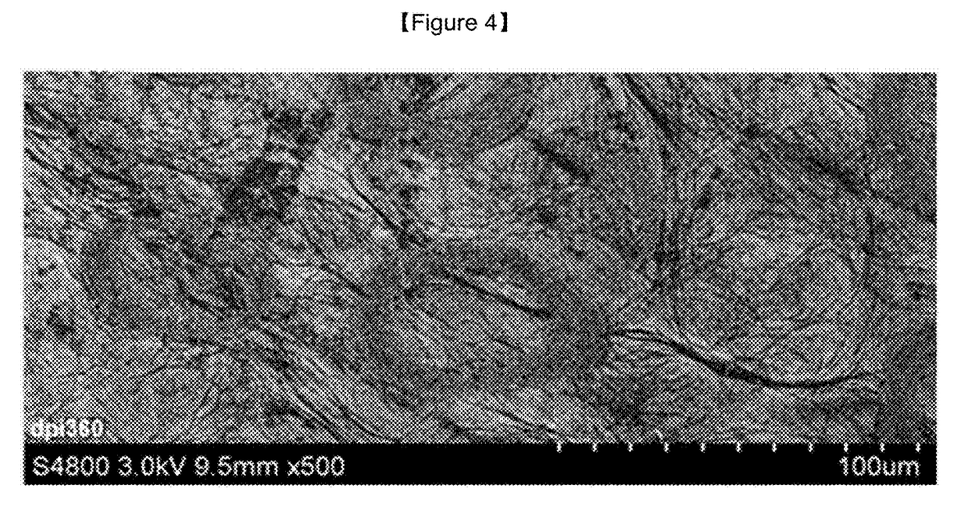
FIGS. 4 and 5 are SEM photographs of the separator according to Example 1 measured at different magnifications, respectively.
Figure 5:
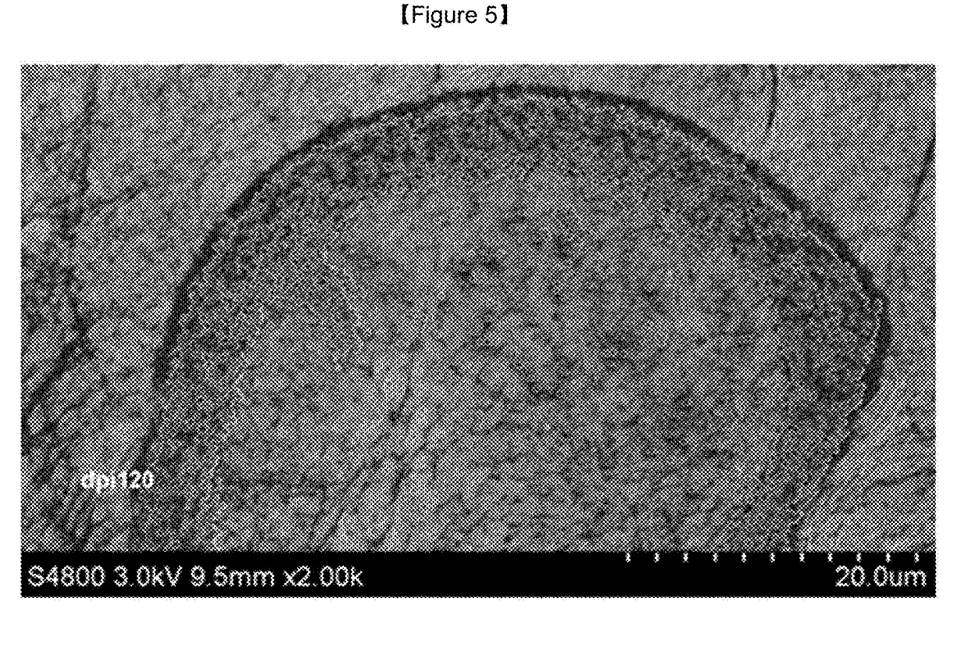

Optical Microscope Image Measurement and Scanning Electron Microscope (SEM) Image Measurement of Separator SEM photographs taken with respect to the separator of Example 1 at different magnifications are shown in FIGS. 4 and 5.

Figure 6:
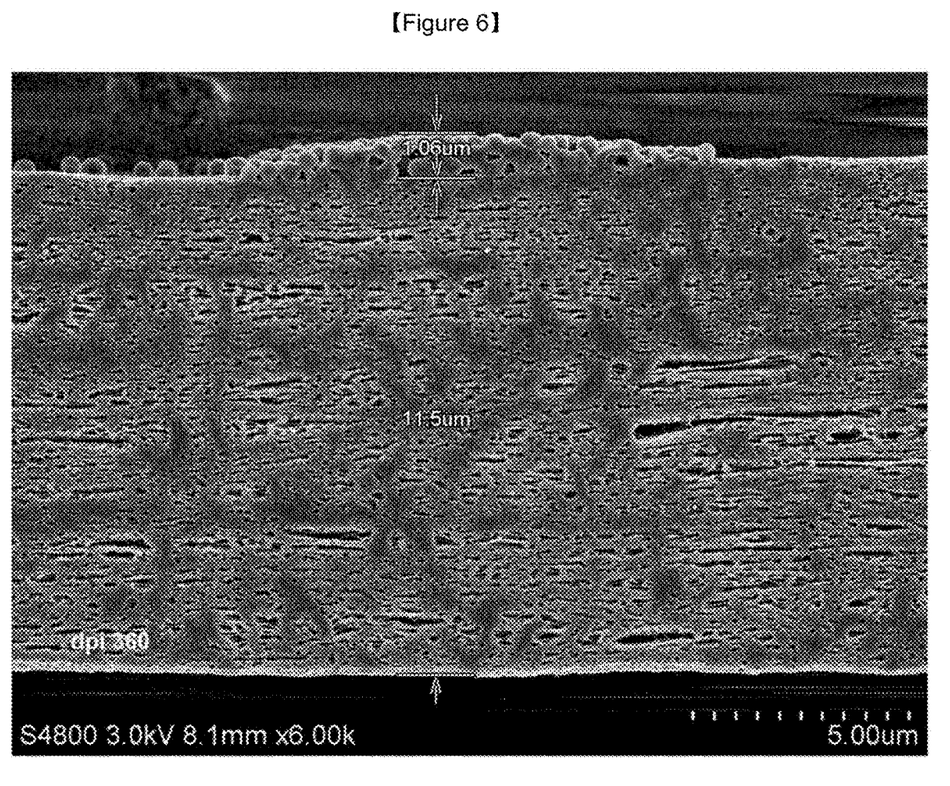
FIGS. 6 and 7 are cross-sectional SEM photographs of separators according to Examples 1 and 2, respectively.
Figure 7:
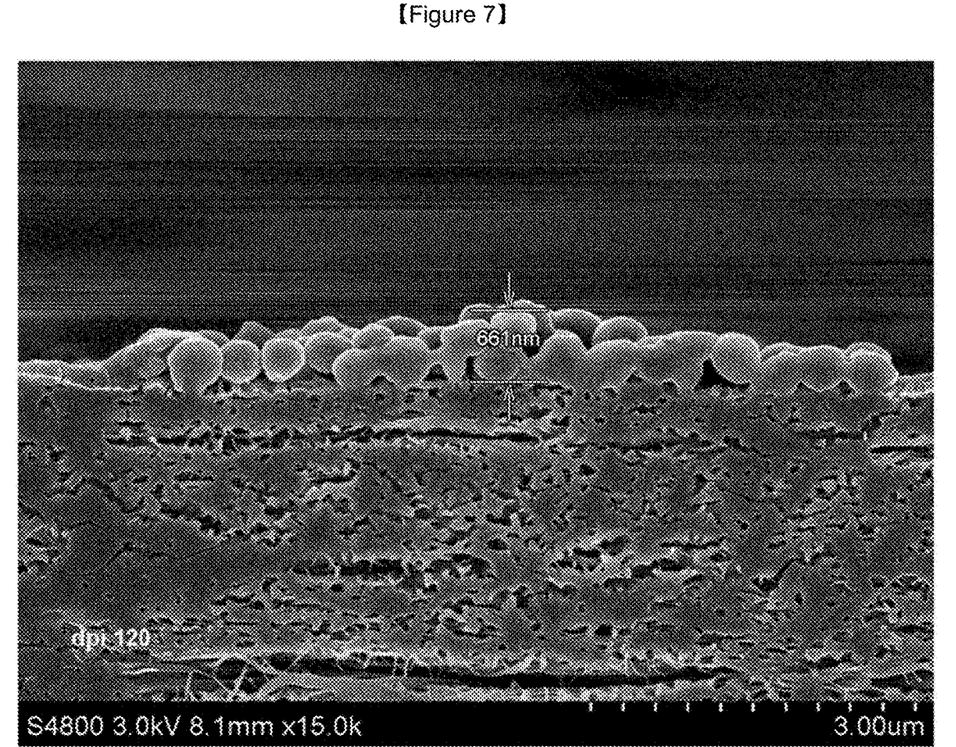

In addition, SEM photographs showing cross-sections of the separators according to Examples 1 and 2 are provided in FIGS. 6 and 7.

Referring to FIGS. 4 and 5, the ring pattern according to an embodiment was spaced apart at regular intervals and had a particle diameter of 10 μm to 200 μm and a width (a thickness of the ring) of 0.2 μm to 1.5 μm, and most of polymer particulates were present in the ring portion of the ring pattern.

In addition, referring to FIGS. 6 and 7, in each separator of Examples 1 and 2, a very thin coating layer having each thickness of 1.06 μm and 661 nm was formed.

Although preferred embodiments of the present invention have been described in detail above, the scope of the present invention is not limited thereto, and various modifications and improvements by those skilled in the art using the basic concept of the present invention as defined in the appended claims are also within the scope of the invention.

The invention claimed is:

1. A separator for a secondary battery, comprising:
   a porous substrate; and
   a coating layer including a plurality of ring patterns on at least one surface of the porous substrate,
   wherein:
      the ring patterns include a plurality of polymer particulates,
      the ring patterns are spaced apart from each other at regular intervals,
      a diameter of each of the ring patterns is 10 μm to 200 μm, and
      a thickness of each of the ring patterns is 0.2 μm to 1.5 μm, the thickness of each of the ring patterns being a difference between an inner diameter and an outer diameter of each of the ring patterns.

2. The separator of claim 1, wherein the ring patterns are spaced apart from each other at an interval of 10 μm to 1000 μm.

3. The separator of claim 1, wherein each of the ring patterns has a diameter of 50 μm to 150 μm.

4. The separator of claim 1, wherein each of the ring patterns has a thickness of 0.5 μm to 1.2 μm.

5. The separator of claim 1, wherein the polymer particulates include at least one of fluorine-based polymer particulates, (meth) acrylic polymer particulates, and a mixture thereof.

6. The separator of claim 1, wherein a particle diameter of the polymer particulates is 100 nm to 600 nm.

7. The separator of claim 5, wherein the fluorine-based polymer particulates include at least one of polyvinylidene fluoride (PVdF), polyvinylidene fluoride-co-hexafluoropropylene, and polyvinylidene fluoride-co-trichloroethylene.

8. The separator of claim 5, wherein the (meth) acrylic polymer particulates include at least one of poly (meth) acrylate, polybutyl (meth) acrylate, polypentyl (meth) acrylate, polyhexyl (meth) acrylate, and polyacrylonitrile.

9. The separator of claim 1, wherein the ring patterns have a loading amount of 0.5 g/m² to 1.5 g/m².

10. The separator of claim 1, wherein the coating layer has a thickness of 0.1 μm to 5 μm.

11. The separator of claim 1, wherein;
   an area of the ring patterns including inner spaces surrounded by the ring patterns is 40% to 80% of a total area of the porous substrate, and
   an area occupied by the ring patterns without the inner spaces surrounded by the ring patterns is 5% to 30% of the total area of the porous substrate.

12. A method of manufacturing the separator of claim 1, the method comprising:
   mixing at least one of fluorine-based polymer particulates, (meth) acrylic polymer particulates, and a mixture thereof with water to prepare a coating layer composition; and
   coating the coating layer composition on the at least one surface of the porous substrate by an inkjet coating method and drying it to manufacture the separator.

13. The method of claim 12, wherein the coating layer composition has a viscosity of 0.1 cps to 10 cps.

14. The method of claim 12, wherein the coating layer composition includes fluorine-based polymer particulates and (meth) acrylic polymer particulates in a weight ratio of 90:10 to 50:50.

15. The method of claim 12, wherein the fluorine-based polymer particulates include polymer particulates having a particle diameter of 100 nm to 300 nm.

16. The method of claim 12, wherein the (meth) acrylic polymer includes polymer particulates having a particle diameter of 250 nm to 600 nm.

17. The method of claim 12, wherein the inkjet coating method includes spraying and coating the coating layer composition with a nozzle number density of 50 (dpi) to 1000 (dpi) of an inkjet head, at a frequency of 1.0 KHz to 10 KHz at a temperature of 20° C. to 55° C., and at a speed of 10 mm/sec to 500 mm/sec on the porous substrate.

18. The separator of claim 1, wherein each of the ring patterns has an annular shape, the plurality of polymer particulates being within the annular shape of each of the ring patterns.

19. A method of manufacturing a separator for a secondary battery, the method comprising:

mixing fluorine-based polymer particulates and (meth) acrylic polymer particulates in a weight ratio of 90:10 to 50:50 to prepare a coating layer composition;

coating the coating layer composition on at least one surface of a porous substrate by an inkjet coating method to form a coating layer, such that the coating layer includes a plurality of ring patterns on the at least one surface of the porous substrate, wherein:

the ring patterns are spaced apart from each other at regular intervals, a diameter of each of the ring patterns is 10 μm to 200 μm, and a thickness of each of the ring patterns is 0.2 μm to 1.5 μm.

* * * * *